US008341707B2

(12) United States Patent
Carley

(10) Patent No.: US 8,341,707 B2
(45) Date of Patent: Dec. 25, 2012

(54) NEAR REAL-TIME MULTI-PARTY TASK AUTHORIZATION ACCESS CONTROL

(75) Inventor: Jeffrey Alan Carley, Colorado Springs, CO (US)

(73) Assignee: Infinite Bay Telecom Limited Liability Company, Dover, DE (US)

( * ) Notice: Subject to any disclaimer, the term of this patent is extended or adjusted under 35 U.S.C. 154(b) by 0 days.

(21) Appl. No.: 13/079,282

(22) Filed: Apr. 4, 2011

(65) Prior Publication Data

US 2011/0179470 A1 Jul. 21, 2011

Related U.S. Application Data

(60) Division of application No. 12/394,342, filed on Feb. 27, 2009, now Pat. No. 7,941,829, which is a continuation of application No. 10/957,547, filed on Oct. 1, 2004, now Pat. No. 7,519,826.

(60) Provisional application No. 60/508,444, filed on Oct. 2, 2003.

(51) Int. Cl.
*G06F 7/04* (2006.01)
*G06F 17/30* (2006.01)
*H04L 29/06* (2006.01)
*H04N 7/16* (2006.01)

(52) U.S. Cl. ................ 726/4; 726/27; 713/182
(58) Field of Classification Search ............. 726/4, 27; 713/182
See application file for complete search history.

(56) References Cited

U.S. PATENT DOCUMENTS

| | | | |
|---|---|---|---|
| 5,764,886 A | 6/1998 | Danielson et al. | |
| 5,907,862 A | 5/1999 | Smalley | |
| 6,108,713 A | 8/2000 | Sambamurthy et al. | |
| 6,157,945 A * | 12/2000 | Balma et al. | 709/206 |
| 6,205,466 B1 | 3/2001 | Karp et al. | |
| 6,219,790 B1 | 4/2001 | Lloyd et al. | |
| 6,304,973 B1 | 10/2001 | Williams | |
| 6,343,320 B1 | 1/2002 | Fairchild et al. | |
| 6,421,691 B1 | 7/2002 | Kajitani | |
| 6,424,647 B1 | 7/2002 | Ng et al. | |
| 6,470,339 B1 * | 10/2002 | Karp et al. | 726/4 |
| 6,678,826 B1 | 1/2004 | Kelly et al. | |
| 6,678,827 B1 | 1/2004 | Rothermel et al. | |
| 6,697,947 B1 | 2/2004 | Matyas, Jr. et al. | |
| 6,775,668 B1 * | 8/2004 | Goel | 1/1 |
| 6,859,841 B2 | 2/2005 | Narad et al. | |
| 6,894,999 B1 | 5/2005 | Acharya | |
| 7,099,934 B1 | 8/2006 | Ewing et al. | |
| 7,231,661 B1 | 6/2007 | Villavicencio et al. | |
| 7,441,043 B1 | 10/2008 | Henry et al. | |
| 7,457,858 B1 | 11/2008 | Levesque | |
| 7,565,529 B2 * | 7/2009 | Beck et al. | 713/156 |
| 7,631,047 B1 * | 12/2009 | Adamczyk et al. | 709/207 |
| 2002/0029337 A1 | 3/2002 | Sudia et al. | |
| 2002/0078301 A1 | 6/2002 | Burnett | |

(Continued)

OTHER PUBLICATIONS

Blaze, M. et al. "The KeyNote Trust-Management System Version 2" (RFC 2704), Sep. 1999.*

(Continued)

*Primary Examiner* — Michael Simitoski

(57) ABSTRACT

A method and apparatus are used in determining authorization to perform tasks in a computer environment, and specifically requiring multiple parties to authorize a task before access is granted. The present system provides for substantially real time communication to a second party authorizer when a task owner is attempting to perform a task.

18 Claims, 7 Drawing Sheets

U.S. PATENT DOCUMENTS

| | | | |
|---|---|---|---|
| 2002/0123938 A1* | 9/2002 | Yu et al. | 705/26 |
| 2002/0133708 A1 | 9/2002 | Gudorf et al. | |
| 2002/0162005 A1 | 10/2002 | Ueda et al. | |
| 2002/0174066 A1* | 11/2002 | Kleckner et al. | 705/39 |
| 2003/0023854 A1 | 1/2003 | Novak et al. | |
| 2003/0033167 A1* | 2/2003 | Arroyo et al. | 705/1 |
| 2003/0097444 A1 | 5/2003 | Dutta et al. | |
| 2003/0156740 A1 | 8/2003 | Siegel et al. | |
| 2003/0221011 A1 | 11/2003 | Shitano | |
| 2004/0003071 A1* | 1/2004 | Mathew et al. | 709/223 |
| 2004/0024477 A1* | 2/2004 | Deitz et al. | 700/86 |
| 2004/0104266 A1 | 6/2004 | Bolle et al. | |
| 2004/0153552 A1 | 8/2004 | Trossen et al. | |
| 2004/0162906 A1 | 8/2004 | Griffin et al. | |
| 2004/0243260 A1* | 12/2004 | Law et al. | 700/86 |

OTHER PUBLICATIONS

Karjoth, Gunter. "Access Control with IBM Tivoli Access Manager", May 2003.*

Miltchev, Stefan et al. "Secure and Flexible Global File Sharing", Apr. 2003.*

Jaehong Park et al.; Towards Usage Control Models: Beyond Traditional Access Control; 2002.

Ravi Sandhu et al.; Usage Control: A Vision for Next Generation Access Control; 2003.

Gail-Joon Ahn et al.; Role-based Authorization Constraints Specification; ACM Transactions on Information and System Security, vol. 3, No. 4, Nov. 2000, pp. 207-226.

PCT Search Report and Written Opinion; Application No. PCT/US04/34707; date of mailing Jul. 8, 2008; 7 pages.

A Model for Multilevel Security in Computer Networks; Lu et al.; IEEE Transactions on Software Engineering, vol. 16., No. 6; Jun. 1990; pp. 647-659;13 pages.

Better Security via Smarter Devices; Ganger et al.; 2001 IEEE, pp. 100-105; 6 pages.

USPTO Office Action; mailed Apr. 8, 2008; U.S. Appl. No. 10/957,547; 12 pages.

USPTO Notice of Allowance and Fees Due; mailed Dec. 2, 2008; U.S. Appl. No. 10/957,547; 6 pages.

USPTO Office Action; U.S. Appl. No. 11/611,210; date mailed Jul. 20, 2009; 27 pages.

USPTO Office Action ; U.S. Appl. No. 12/352,161; date mailed Jul. 23, 2010; 22 pages.

USPTO Office Action; U.S. Appl. No. 11/946,976; date mailed Oct. 1, 2010; 24 pages.

USPTO Office Action; U.S. Appl. No. 11/611,210; date mailed Oct. 8, 2010, 24 pages.

USPTO Office Action; U.S. Appl. No. 11/611,210; date mailed May 23, 2011, 28 pages.

Garfinkel, Simson et al., "Practical Unix & Internet Security, Second Edition", O'Reilly & Associates, Inc., 1996, pp. 54-55.

Office Action in U.S. Appl. No. 11/946,976 issued Jun. 17, 2011, 10 pages.

Office Action in U.S. Appl. No. 11/946,976 issued Mar. 13, 2012, 8 pages.

Office Action in U.S. Appl. No. 11/946,976 issued Aug. 10, 2012, 5 pages.

* cited by examiner

NEAR REAL-TIME MULTI-PARTY TASK AUTHORIZATION ACCESS CONTROL

CROSS-REFERENCE TO RELATED APPLICATIONS

The present application is a divisional of U.S. application Ser. No. 12/394,342, filed Feb. 27, 2009(now U.S. Pat. No. 7,941,829), which is a continuation of U.S. application Ser. No. 10/957,547, filed Oct. 1, 2004 (now U.S. Pat. No. 7,519,826), which claims the benefit of U.S. Provisional Appl. No. 60/508,444, filed Oct. 2, 2003; the disclosures of each of the above-referenced applications are incorporated by reference herein in their entireties.

FIELD OF THE INVENTION

The present invention relates in general to methods and apparatus used in determining authorization to perform tasks in a computer environment and more particularly to methods and apparatus for requiring multiple parties to authorize a task before authorization is granted.

BACKGROUND OF THE INVENTION

In recent years, computers have proliferated in all parts of worldwide society, including but not limited to, banking, financial services, business, education, and various governmental entities. For instance and without limitation, these computer systems allow individuals to consummate financial transactions, to exchange confidential scientific and/or medical data, and to exchange highly proprietary business planning data. Hence, these computer systems require and/or allow very sensitive and confidential data to be stored and transmitted over great geographic distances. Computer systems have also been integrated with the command and control of much of the critical infrastructure of the world including power production and distribution, gas and oil production and distribution, transportation, communications, and medical as well as others. Proper and secure functioning of computer systems is critical for the functioning of practically every system today.

Moreover, the rise of multinational communications networks, such as the publicly available Internet communications system, has truly made the world a smaller place by allowing these computers, separated by great geographic distances, to very easily communicate and exchange data. In essence, these worldwide communications channels/networks; sometimes collectively referred to as "the Information Superhighway" have electronically connected the peoples of the world—both the good and the very bad.

That is, while these computer systems have increased efficiency and greatly changed the manner in which we work and interact, they have been especially prone to unauthorized "break-ins", viral destruction, and/or unauthorized data modifications. Accordingly, the rather sensitive and confidential data which is stored and used within these computer systems and transmitted between these computer systems has been the target of attack by people known as "hackers", by high level and very sophisticated espionage and industrial spies, and by terrorists seeking high profile methods of causing destruction and fear. Computer access security and data transmission security has recently come to the forefront of importance and represents one of the great needs of our times.

Many attempts have been made to create and utilize various techniques to "ensure" that only authorized users are allowed to gain access to these respective computer systems. These prior techniques, while somewhat effective, suffer from various drawbacks.

For example, one such prior computer system security technique comprises the use of predetermined "passwords". That is, according to this security technique, each computer system has a list of authorized passwords which must be communicated to it before access is given or allowed. In theory, one or more "trusted" system administrators distribute these "secret" passwords to a group of authorized users of a computer system. The "secret" nature of the passwords, in theory, prevents unauthorized users from accessing the computer system (since presumably these unauthorized users do not have the correct passwords). This technique is not very effective since oftentimes those authorized individuals mistakenly and unwittingly expose their password to an unauthorized user. Moreover, this technique of data security may be easily "broken" by a "hacker's" deliberate and concentrated attempt at automatically inputting, to the targeted computer, hundreds and perhaps thousands of passwords until an authorized password is created.

In addition to the prior password technique other, more sophisticated access techniques are known and used. For example, there are known techniques which require the possession of a physical object or feature, such as "access cards" which are "read" by a card reading device and biometric authentication techniques (e.g. requiring the initial input of such authorized user physical characteristics as fingerprints and eye patterns and the later comparison of these input patterns to those of a "would-be" user). Both of these prior techniques are relatively complicated, are relatively costly, and are prone to error, such as and without limitation, mistaken unauthorized entry due to their complexity. These techniques are also prone to unauthorized entry by use of counterfeit and/or stolen cards, objects, and fingerprint readers. Other prior data security techniques, such as encryption, attempt to prevent unauthorized use of transmitted data or unauthorized access to a computer system by modifying and/or changing the transmitted data in a certain manner, and/or requiring the transmission and receipt of modified data before access is granted. While somewhat effective, these prior encryption techniques are relatively costly and complicated and require one or more known "encryption keys" which are in constant exchange between users and which are themselves susceptible to theft and/or inadvertent disclosure.

There therefore exists a significant possibility that an individual=s credentials for authentication or authorization can be compromised. In addition, there also exists the possibility of an authorized individual becoming compromised. Having an authorized individual become compromised is one of the most difficult security concerns to protect against.

The concept of separation of duties as a protection against a compromised party in a position of authority is well established in many applications. The key concept is that one person alone cannot complete a critical process. For example, in accounting, the same individual does not keep the books and audit them. Similarly, two signatures are often required on a check above a pre-determined limit. In banks, two keys are usually needed to open a safe deposit box. In the same vein, the same person who performs change management of a network should not be the one who audits the logs of what has happened in the network. Separation of duties should be a key part of a security policy.

Separation of duties has also become a key component of workflow design. Under this concept, no one person should have the ability or permission to complete all the tasks necessary for a critical process that could compromise the security of the company. If one party submits a network administration order, another person should have to approve the order. The same party that initiates a Change Management Request (CMR) should not approve the CMR.

Most of the current research on the use of separation of duties in access control systems is focused on ensuring that authorizations for tasks are managed to provide for separation of duties. When separation of duties is utilized in the workflow environment, some amount of delay is generally acceptable between tasks.

However, there is a need to be able to protect particular data or an individual task from a compromised authorized individual. It is also necessary to be able to provide this protection with no or minimal disruption to the abilities of the authorized individuals to perform the tasks they need to perform for which they need access to the information or system. This requires a solution that is non-disruptive to the tasks that need to be completed, as automated as possible, and that can occur in near real time.

There is therefore a need to provide a technique to substantially prevent the ability of a single authorized individual to access a computer system or data which overcomes the various drawbacks of these afore-described prior techniques. There is also a need to provide a technique for this protection in which authorization can take place in near real time.

BRIEF SUMMARY OF THE INVENTION

The present invention is analogous to a safe deposit box where the box owner has one key (authorization) to open the box but still needs the bank manager to approve of the opening of the box by using their second key (authorization) before the box can be opened. Without both the box owner and the bank manager agreeing that the box should be opened (by providing their keys), the box does not get opened. The present system provides the infrastructure needed to require multiple parties to authorize a specific task before it can be performed.

In one embodiment, a method of securing access to computer system resources by requiring multiple party authorization before access to the resources is granted comprises the following steps. A networked computer system is provided that comprises a requestor interface connected to an authorization agent wherein the authorization agent is adapted to control access to resources contained in a protected device. An authorization server is connected to the authorization agent. A policy engine is connected to the authorization server, wherein the policy engine determines what resources contained in the protected device will have restricted access and the requirements for the access. Each request for access from a requestor to a resource that the policy engine has predetermined will have restricted access requires authorization for access through the authorization server from an authorizer substantially simultaneously with each request for access.

In another embodiment, a network computer system for restricting access to resources contained in a protected device comprises a requestor interface connected to a protected device. An authorization agent is connected to a requestor interface and to the protected device, wherein the authorization agent is adapted to control access to resources contained in the protected device. An authorization server is connected to the authorization agent. A policy engine is connected to the authorization server, wherein the policy engine determines what resources contained in the protected device will have restricted access and the requirements for the access. An authorizer connected to the authorization server for providing authorization for access to a resource is predetermined by the policy engine. The authorizer further provides authorization for access substantially simultaneously with a request for access by a requestor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
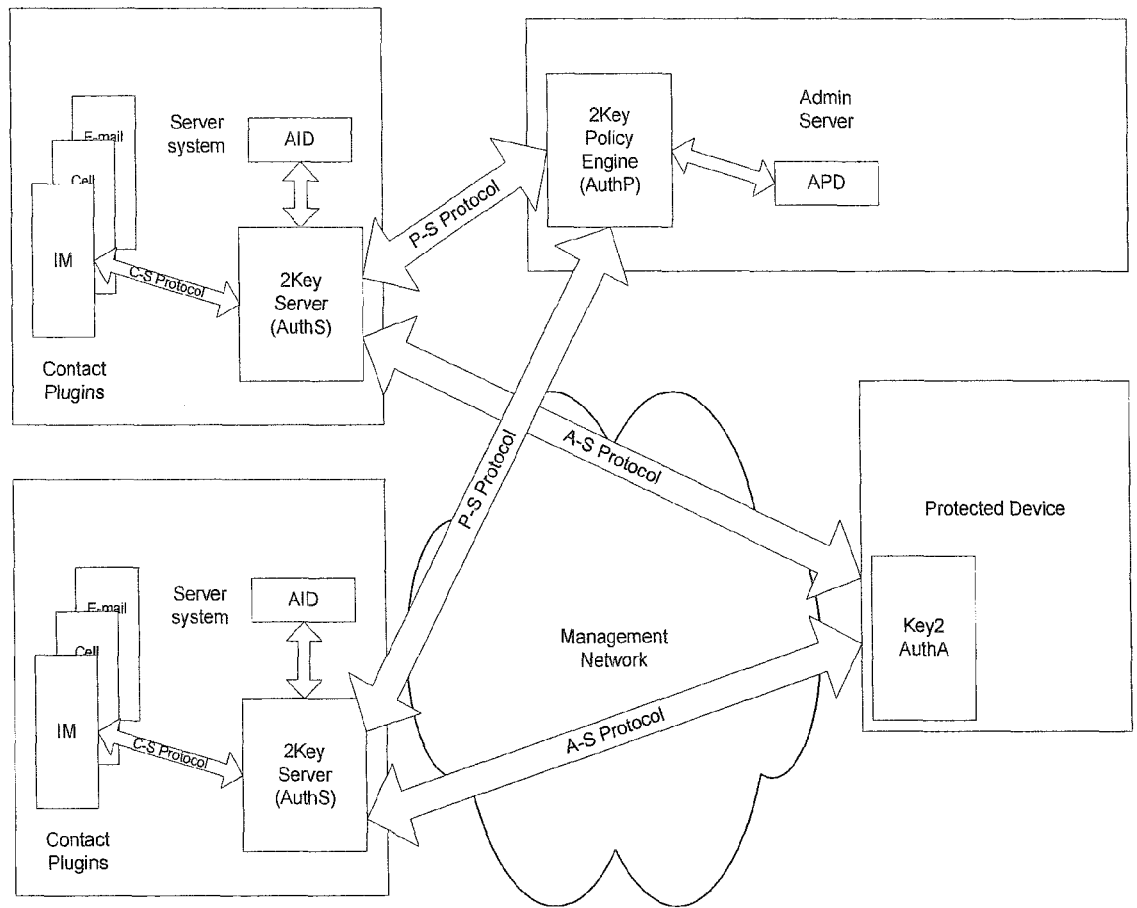
FIG. 1 is a high-level flow chart demonstrating an exemplary system in accordance with the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is a method and related system for computer security. The system requires multiple parties to each authorize a task before final authorization is granted. This access control system operates in substantially real time.

At least some of the following discussion makes reference to a particular system that embodies many of the features described herein. The particular system is referred to as the Key2 Technology™. Of course, the present invention is not limited to the specific embodiment referred to herein as "Key 2™."

The present system and method have the capability to operate in near real time, just as both the box owner and the bank manager need to be present with their keys to open the safe deposit box. One of the challenges that the system overcomes is providing for timely communication to a 2nd party authorizer (bank manager) when the user requesting access (box owner) is attempting to perform the task. With the present computer system, the policy could require a second party to approve the task substantially simultaneously when access to a task is attempted—i.e., the approval needs to happen in near real time.

While Key2 Technology, one example of the present invention, can be integrated with any of the access control models in widespread use, it fits particularly well with the "Usage Control" model. The Usage Control model includes the concept of obligations that need to be satisfied before a task is authorized or for a task to remain authorized. Requiring a second party to approve a task before it can be performed fits nicely within the obligations component of the model. The Usage Control Model allows for the expansion of discretionary access control models, mandatory access control models, and role-based access control models to support Key2 Technology.

Multi-party authorization will proactively require two people to know and approve critical actions before they take effect. This is a radical improvement over current approaches that often only provide logs for later analysis.

Key2 Technology provides sensitive and critical network, computer system, and database operations with greater levels of security than ever before. The challenge is to enable a network administrator to do their job efficiently while at the same time protecting the network against a compromised administrator or requestor for access to a network resource. Key2 Technology provides for dynamic policy changes, including what resources to protect and what parties to utilize as authorizers, managed from a central location. Near real-time communication between the party initiating the task (requestor), the Key2 system, and the 2nd party approver of the task (authorizer) is an integral part of the Key2 system.

Key2 Technology provides for both centralized policy management and multi-party authorization request processing. Policy management includes tracking the resources or tasks (collectively referred to as "resources" or "tasks") that require multi-party authorization and tracking who the authorizers are for those tasks. The Key2 policy engine synchronizes with the database of resources that are to be protected on each of the distributed Key2 servers. The Key2 servers will register the categories of protected resources with the Key2 agents for which the agents will need to request authorization from the Key2 server. The policy engine will push the information to the Key2 servers to enable them to determine the proper set of authorizers to choose from for a requested task.

The Key2 Technology architecture as shown in FIG. 1 includes several components and interfaces. They include:

Key2 Authorization Agent (AuthA) module runs on the system that protects the resources (specific, predetermined files) with Key2 Technology.

Key2 AuthA Application Programming Interface (API) allows the resource manager of the protected resource to utilize Key2 Technology.

Key2 Authorization Server (AuthS) runs on various servers in the management network to handle authorization requests from the authorization agents. From the information in the authorization request and the information in the authorization information database (AID) including policy information, the AuthS will determine the best authorizer to attempt to contact and coordinate the contact.

Key2 A-S is the protocol for interactions between the authorization agents (AuthA) and the authorization servers (AuthS).

Key2 Authorization Information Database (AID) defines the structure of the information that needs to be stored in order to provide for Key2 authorization.

Key2 Contact Plug-ins interact with a specified authenticator. Plug-ins for Instant Messenger, E-Mail, mobile and fixed-line, Phone, PDA are all possible.

Key2 C-S is the protocol for interactions between the authorization server (AuthS) and the Contact plug-ins.

Key2 Policy Engine updates the Authorization Policy Database (APD) and synchronizes all of the authorization servers (AuthS) modules with the current APD.

Key2 Authorization Policy Database (APD) defines the policy information and the structure of that information that needs to be saved for the Key2 authorization system.

Key2 Policy API defines the interface for configuration and update of authorization policy for the Key2 authorization system.

Decisions on what tasks or resources (e.g. sensitive files) need to be protected with multi-party authorization are made at a user interface to the Key2 policy engine. Policy on which resources or tasks to protect with Key2 can be based on a wide variety of attributes of the resource or task as well as on environmental factors. Some exemplary attributes of tasks might include disruptiveness and criticality among others. For example, if there is a task called "reload", it might have attribute disruptiveness=10 (Very High). If this for the task on a router supporting the stock exchange it might have criticality=8 (High), but if it is for the task on a router in a test lab it might have criticality=0 (Very Low). Policy can be set for classes of resources or tasks, or for specific resources or tasks. Another attribute will be the name of an authorizer list and a priority for contact with respect to authorization.

An example of how environmental factors can play a role would include the status of a device. It would be possible to define a status for a device or resource than included values such as production, non-disruptive test, disruptive test, or maintenance, among others. If the resource is in production status it might require multi-party authorization to perform the "reload" task, while if the resource is in maintenance status the "reload" task might not require multi-party authorization.

Figure 2:
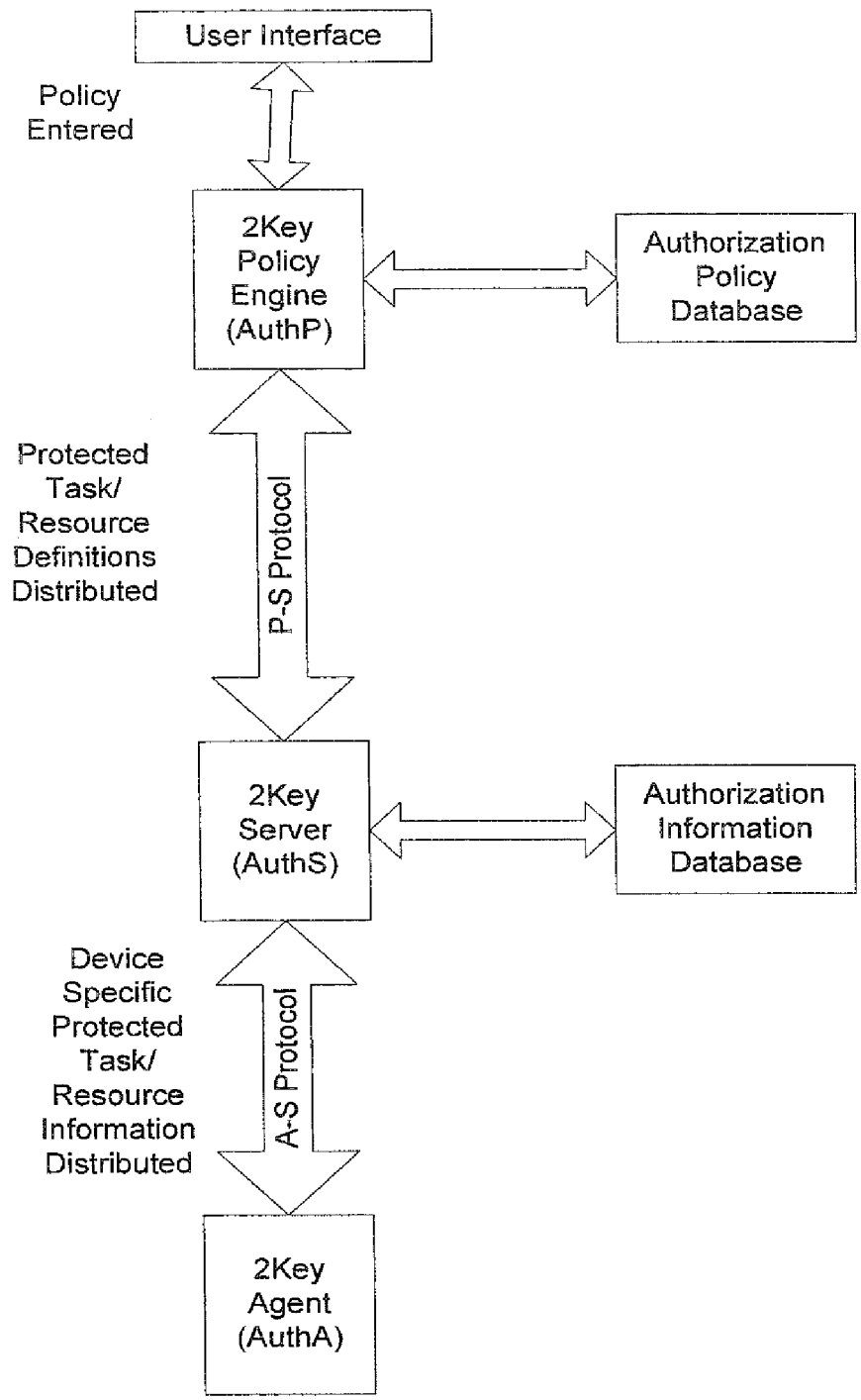
FIG. 2 is a flow chart demonstrating interaction of a policy engine in the security system.

As shown in FIG. 2, the Key2 policy engine will distribute the information on resources to be protected by multi-party authorization to the Key2 servers. The Key2 servers will store this information in their authorization information database. They also will communicate with the Key2 agents informing them of the resources or tasks they should be protecting with multi-party authorization or instructing the Key2 agents to always query the Key2 servers for particular classes of tasks or resources. The Key2 agent will maintain the definitions of resources or tasks that require multi-party authorization and communicate multi-party authorization requests to the Key2 Servers.

Figure 3:
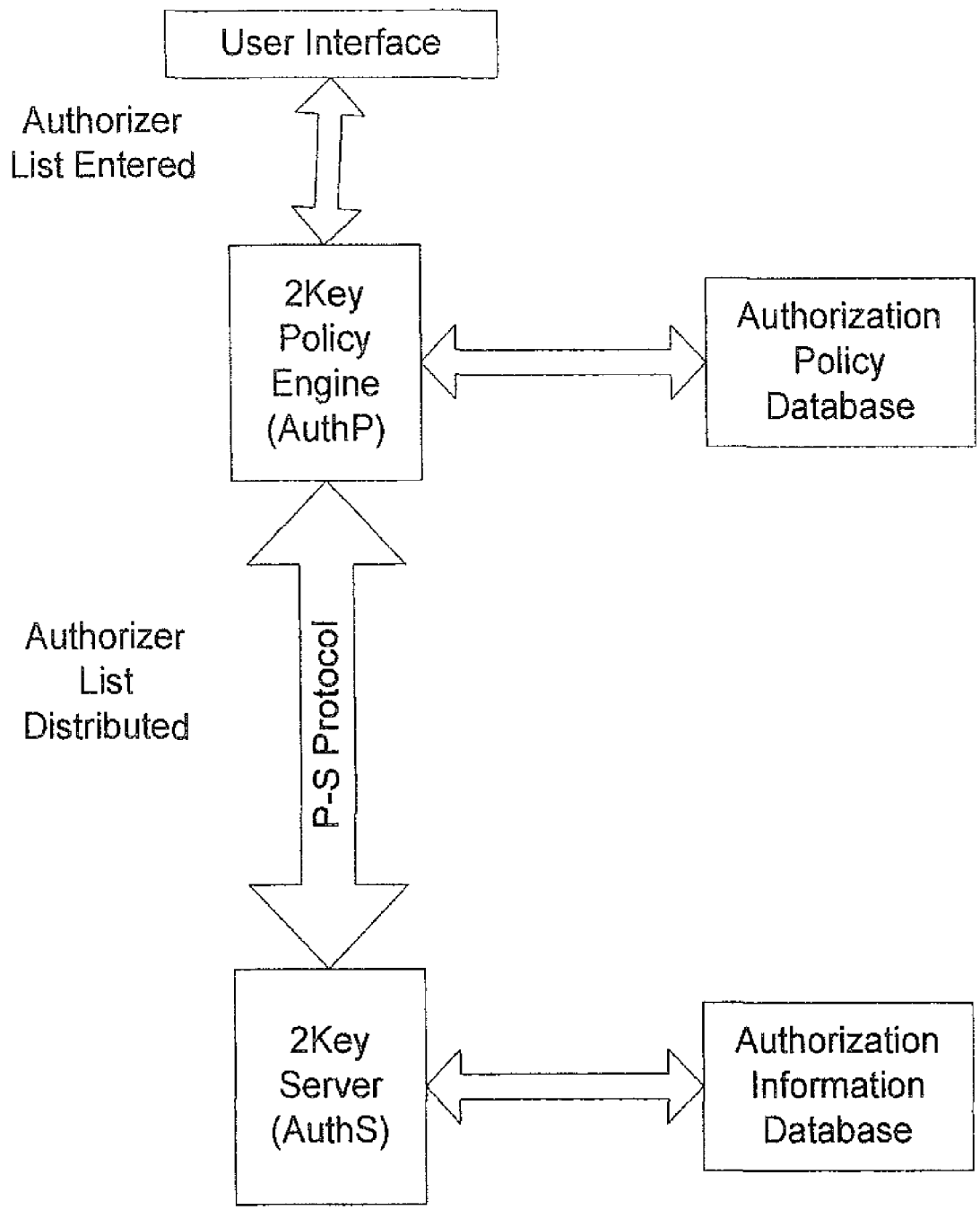
FIGS. 3-5 are flow charts demonstrating operation of the second party authorization.

As shown in FIG. 3, definitions of who is able to provide second party authorization is also defined at a user interface to the Key2 policy engine. An authorizer list and authorizer records are created that provides a list of parties eligible to provide 2nd party authorization, contact information on methods to contact the authorizer including a list of current preferred order of methods of contact, hours responsible for providing authorization, authorizer status, and a preferred priority list ordering which authorizer to attempt to contact first. Another option is to specify attempting to contact multiple authorizers simultaneously.

Figure 4:
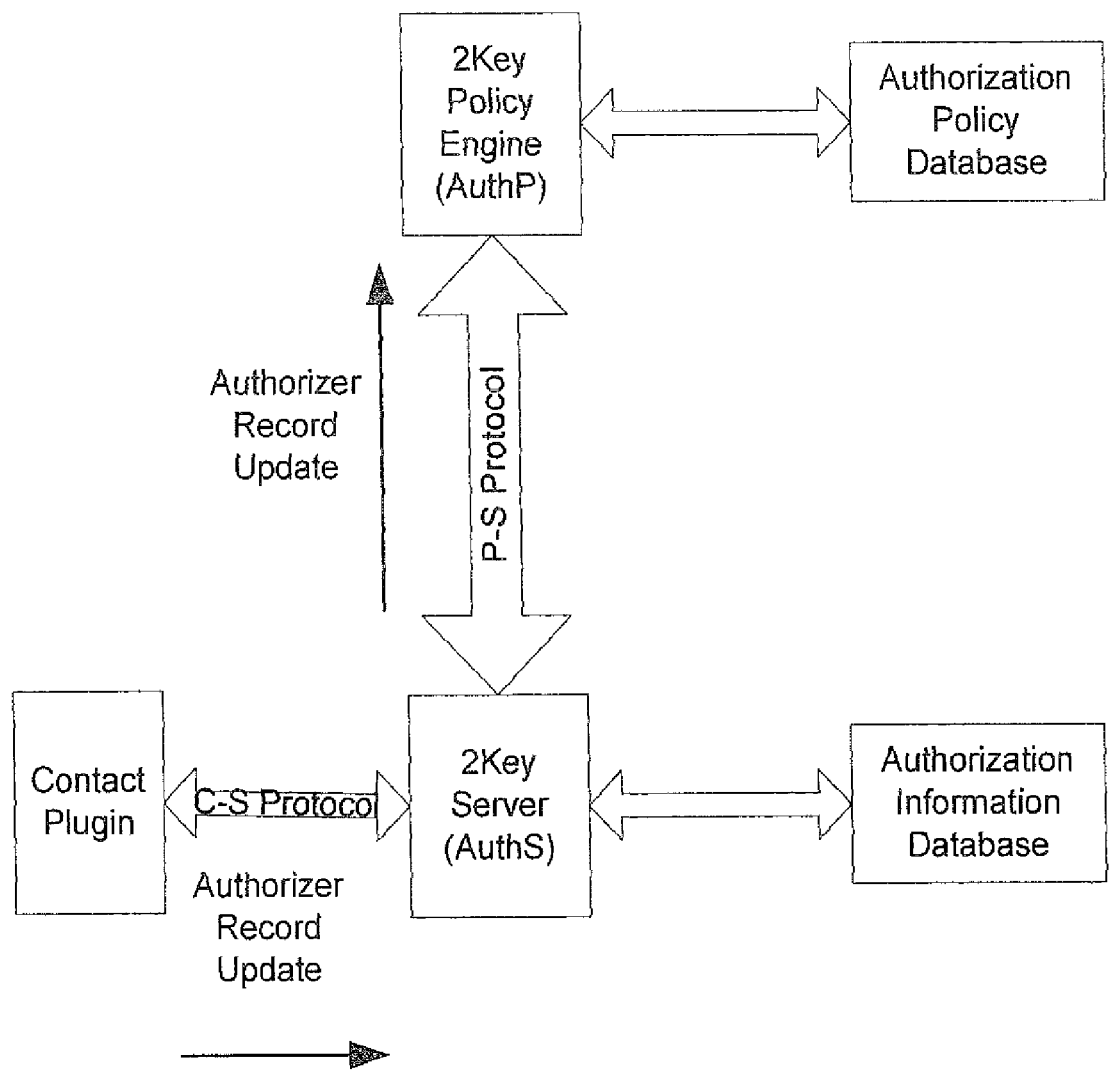

As shown in FIG. 4, an authorizer communicates with the Key2 system through a Contact Plugin. Plugins will be developed for a number of communications media. An authorizer can contact the Key2 system and update select information in their authorizer record which will also be reflected in the authorizer lists. Examples of the type of information an authorizer will be able to modify includes their status, contact methods, and preferred order of contact methods.

The resource managers for the protected resources will need to call on the Key2 authorization agent (AuthA). In some cases, this may be a stand-alone add-on. In other cases it might be necessary or preferable to have the Key2 authorization calls integrated into the security kernel. Some of the most obvious resource managers for inclusion of Key2 Technology include operating systems (including configuration and management subsystems), file systems, and data base systems.

Figure 5:
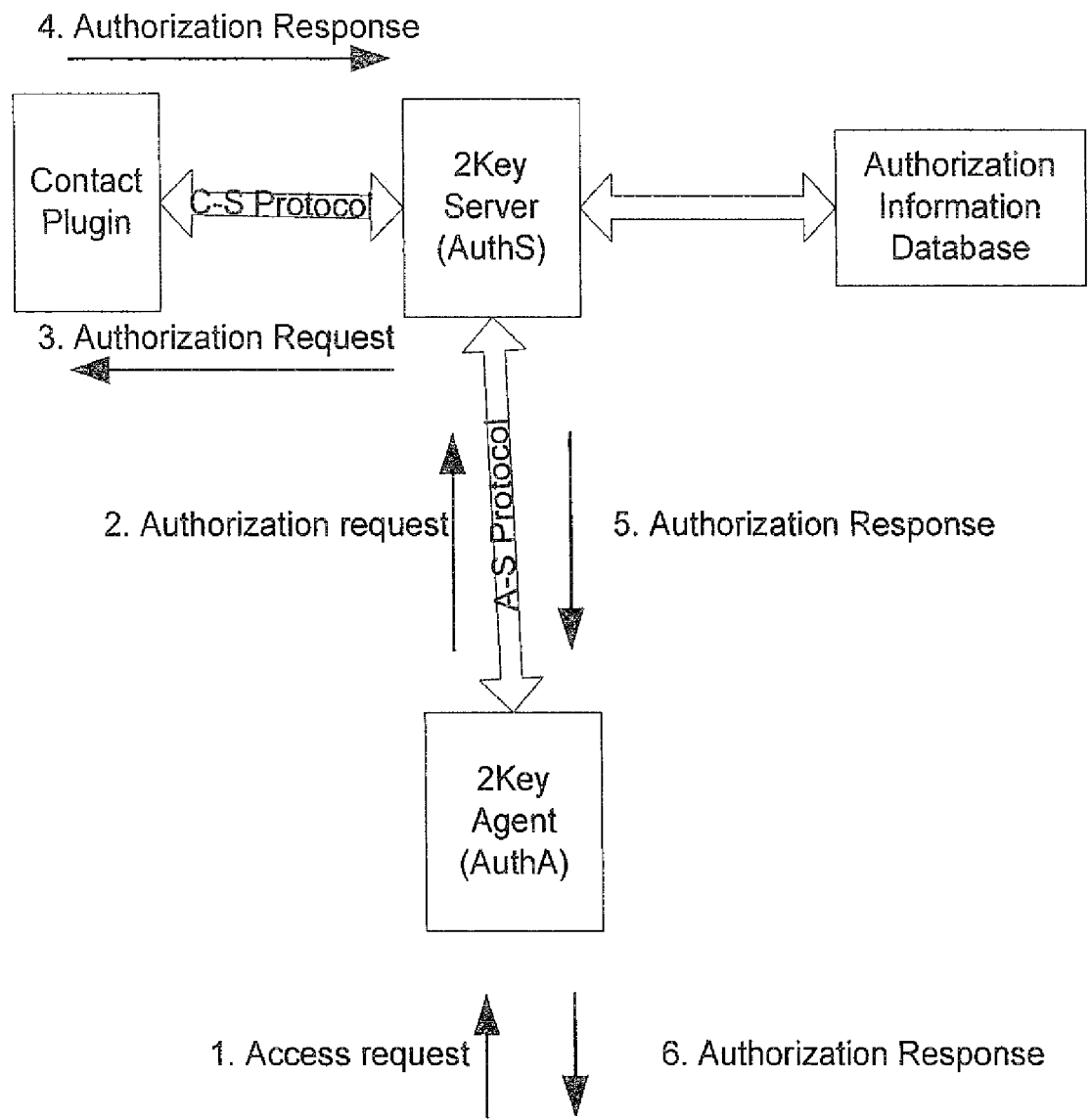

As shown in FIG. 5, the first step in the process is for a person (the "requestor"), using a requestor interface, to seek access to a particular resource. When a Key2 agent determines that an authorization request requires multi-party authorization, it forwards the information needed for the authorization decision to the Key2 server. If the server concurs that multi-party authorization is required, the server determines the preferred authorizer(s) for the task and utilizes the appropriate contact plug-in to provide them with the needed information. Some of the included information could include, the task to be performed, the resource it is to be performed on, the party (requestor) attempting to perform the task, any comments they elected to enter, and contact information for the party initiating the task in case the authorizer requires a conference with the task initiator before making an authorization decision. The authorizer then replies to the server through the contact plug-in with the authorization decision. The server passes this decision to the agent and then ultimately to the requestor.

Figure 6:
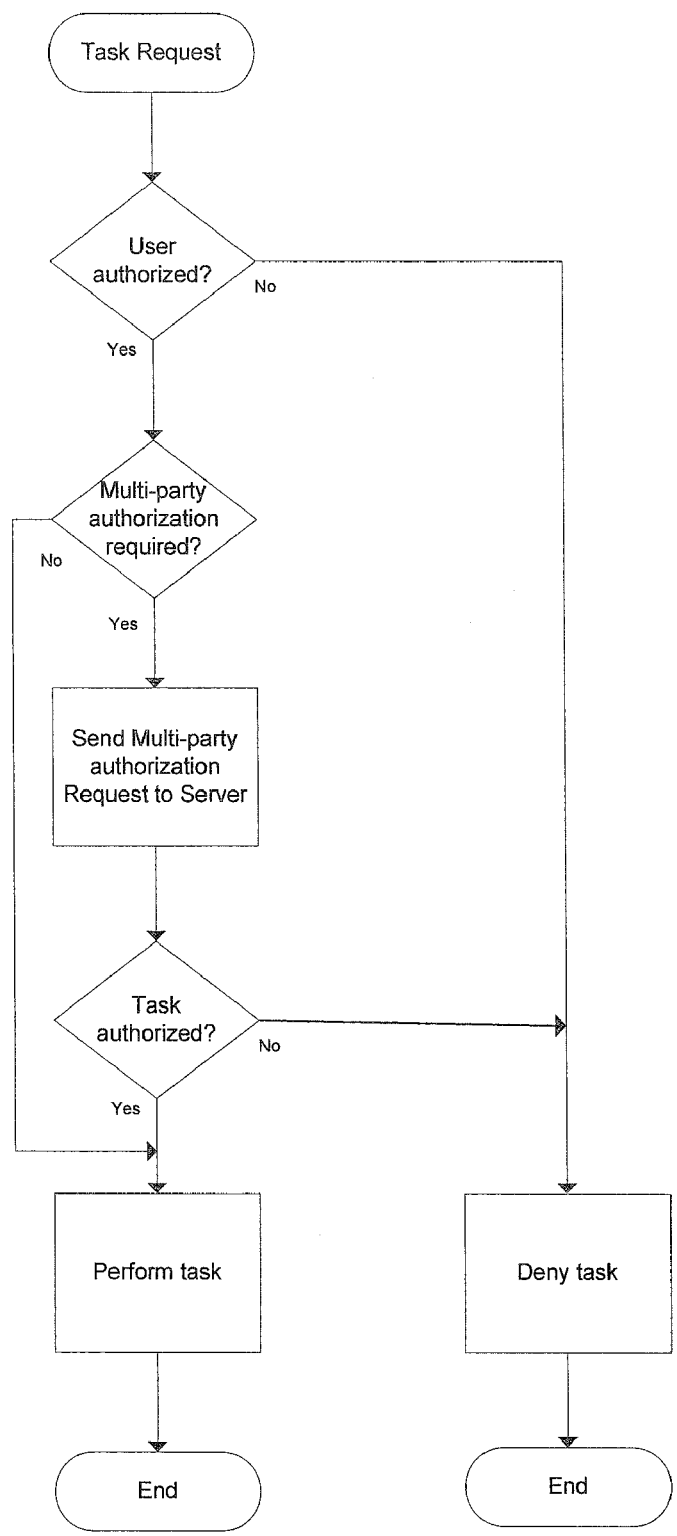
FIGS. 6 and 7 are flow charts of operation of a task request and authorization.

The flow of a multi-part authorization request on a Key2 Authorization Agent is exemplified by the flowchart shown as FIG. 6.

Figure 7:
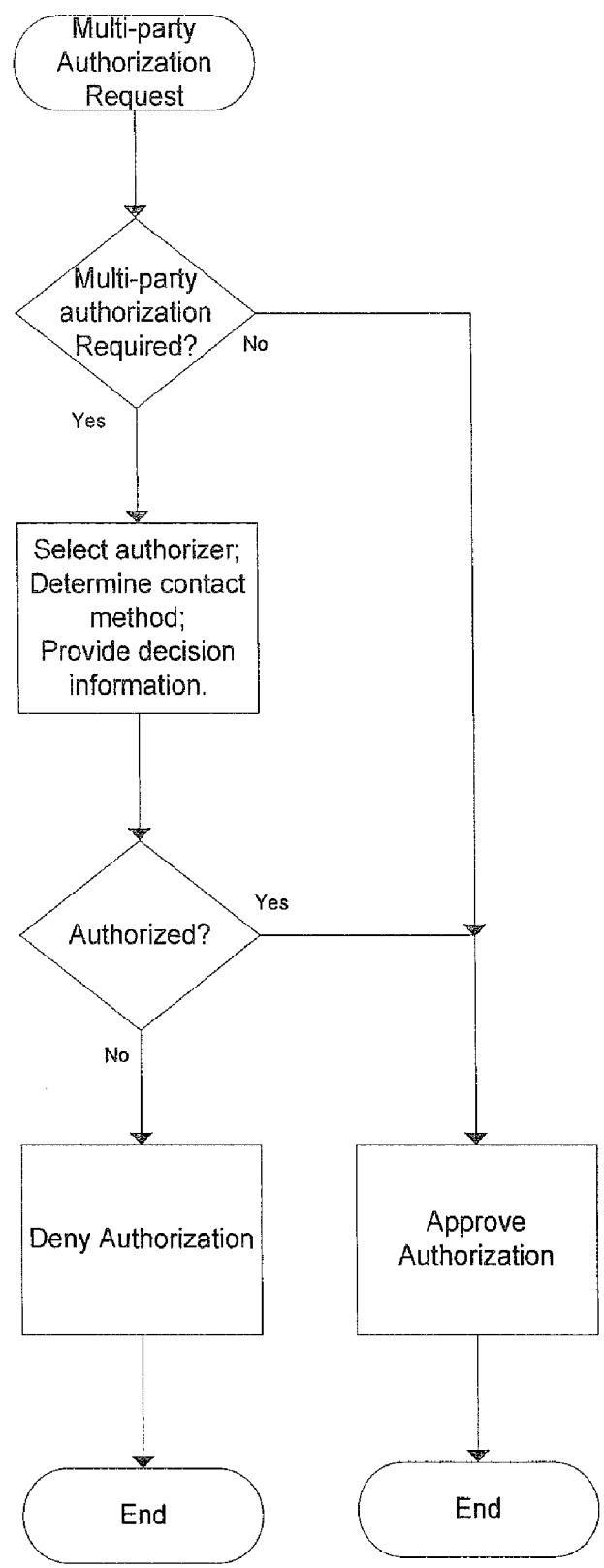

An authorization request flow on a Key2 Server is exemplified by the flowchart shown as FIG. 7.

Integration of Key2 Technology into the security kernel of operating systems of computers and network equipment, file systems, and database managers adds significant value to those systems when used in a secure environment. It allows management to require and set multi-party authorization for execution of certain commands, read or write access to certain files, and read or write access to certain fields of a database. With the appropriate policy in place, one authorized individual will no longer be able to shut down a critical server, read the entire database of customer credit card numbers, or launch a test procedure in the production network that could take the entire network down. Some of the most destructive attacks that have occurred and some of our most dangerous vulnerabilities are addressed with Key2 Technology.

Multi-party authorization greatly improves security, but to be effective any associated overhead must be kept to a minimum. Key2 Technology provides the security that comes from multi-party authorization while at the same time limiting its burden. The Key2 Technology architecture provides a workable distributed multi-party authorization system for resource control.

While the invention has been described with reference to specific embodiments thereof, it will be understood that numerous variations, modifications and additional embodiments are possible, and all such variations, modifications, and embodiments are to be regarded as being within the spirit and scope of the invention.

That which is claimed:

1. A method, comprising:
   a server receiving, from an administration system, a list of resources and respective authorizers eligible to grant requests for access to the resources;
   the server receiving, from a computing device, a request for access to a resource of the computing device;
   the server requesting authorization for the request from at least two authorizers, wherein the list identifies the at least two authorizers as being eligible to grant the request for access to the resource; and
   in response to receipt of the authorization for the request, the server sending, to the computing device, indication that the request has been authorized by the at least two authorizers.

2. The method of claim 1, wherein the server requests authorization for the request by contacting an authorizer via an electronic message.

3. The method of claim 1, wherein the server requests authorization for the request by contacting an authorizer via a phone notification.

4. The method of claim 1, wherein the request includes a request to access a specified file on the computing device.

5. The method of claim 1, wherein a plurality of servers including the server receive lists from the administration system, wherein the plurality of servers are configured to request authorization for requests from authorizers; and
   wherein the method further comprises the server identifying, to the computing device, resources of the computing device for which requests are to be authorized.

6. The method of claim 1, wherein the list specifies, for a given authorizer, a preferred order of contact methods for that authorizer.

7. The method of claim 1, wherein the list specifies, for a given authorizer, when that authorizer is available to grant authorization for requests.

8. The method of claim 1, wherein the request is a request to modify a particular field of a database maintained by the computing device.

9. A server system, comprising:
   a processor; and
   memory having stored therein program instructions executable by the processor to:
      receive, from an administration system, a list of tasks and respective authorizers eligible to grant requests for performance of the tasks;
      receive a request for performance of a task by a computing device;
      request authorization for performance of the task from at least two of a set of authorizers, wherein the at least two authorizers are specified by the list as being eligible to grant the request for performance of the task; and
      in response to receiving the authorization, send, to the computing device, indication that performance of the task has been authorized.

10. The server system of claim 9, wherein performance of the task includes executing a particular command on the computing device.

11. The server system of claim 9, wherein the program instructions are executable to:
   receive a list provided from the administration system to a plurality of servers, wherein the plurality of servers are configured to request authorization for performances of tasks by computing devices.

12. The server system of claim 9, wherein the request is to access a particular file on the computing device, and wherein the list specifies at least two authorizers able to grant authorization for accessing the particular file.

13. The server system of claim 9, wherein the list specifies when a given authorizer is available to grant authorization for performance of a task and a preferred method of contact for the given authorizer.

14. The server system of claim 9, wherein the program instructions are further executable to:
   identify, to the computing device, a set of tasks that require authorization before being performed by the computing device.

15. A method, comprising:
   a computing device receiving a request for a resource of the computing device;
   the computing device notifying a server of the request for the resource of the computing device, wherein the server stores a list received from an administration system, wherein the list specifies resources and respective authorizers eligible to grant requests for access to the resources;
   the computing device receiving indication of authorization for the request from the server, wherein the server identifies at least two authorizers based on the list and the requested resource, and wherein the computing device receives indication of the authorization for the request in response to the at least two authorizers granting authorization for the request; and in response to receipt of indication of the authorization for the request, the computing device granting access to the resource.

16. The method of claim 15, wherein the resource is a database maintained by the computing device, and wherein the request is a request to modify a particular field of the database.

17. The method of claim 15, wherein the resource is a file in a file system of the computing device, and wherein the request is a request to read from or write to the file.

18. The method of claim 15, further comprising:
the computing device receiving, from the server, a list of resources identified as requiring authorization from a plurality of authorizers; and in response to receiving the request, the computing device examining the list received from the server to determine whether to notify the server of the received request.

* * * * *

UNITED STATES PATENT AND TRADEMARK OFFICE
CERTIFICATE OF CORRECTION

| | | |
|---|---|---|
| PATENT NO. | : 8,341,707 B2 | Page 1 of 1 |
| APPLICATION NO. | : 13/079282 | |
| DATED | : December 25, 2012 | |
| INVENTOR(S) | : Carley | |

It is certified that error appears in the above-identified patent and that said Letters Patent is hereby corrected as shown below:

In the Specification:

In Column 1, Line 8, delete "2009(now" and insert -- 2009 (now --, therefor.

In Column 2, Line 47, delete "individual=s" and insert -- individual's --, therefor.

Signed and Sealed this
Seventeenth Day of September, 2013

Teresa Stanek Rea
*Deputy Director of the United States Patent and Trademark Office*